United States Patent [19]

Takeuchi

[11] Patent Number: 4,747,800

[45] Date of Patent: May 31, 1988

[54] DAMPER DISC WITH SERIAL TORSION SPRINGS

[75] Inventor: Hiroshi Takeuchi, Osaka, Japan

[73] Assignee: Kabushiki Kaisha Daikin Seisakusho, Osaka, Japan

[21] Appl. No.: 943,852

[22] Filed: Dec. 22, 1986

Related U.S. Application Data

[63] Continuation of Ser. No. 758,997, Jul. 25, 1985, abandoned.

[30] Foreign Application Priority Data

Jul. 31, 1984 [JP] Japan ................................. 59-162340

[51] Int. Cl.[4] .............................................. F16D 3/14
[52] U.S. Cl. .................................... 464/64; 192/106.2; 464/68
[58] Field of Search ........................... 192/106.1, 106.2; 464/64, 66, 68

[56] References Cited

U.S. PATENT DOCUMENTS

| | | | |
|---|---|---|---|
| 2,065,601 | 12/1936 | Meyer | 464/66 X |
| 3,259,222 | 7/1966 | Jania | 192/106.2 X |
| 4,139,995 | 2/1979 | Lamarche | 464/64 |
| 4,148,200 | 4/1979 | Schallhorn et al. | 464/66 X |
| 4,269,296 | 5/1981 | Flotow et al. | 464/64 |
| 4,533,338 | 8/1985 | Hamada | 464/64 |
| 4,569,668 | 2/1986 | Fukushima | 464/68 |

FOREIGN PATENT DOCUMENTS

| | | | |
|---|---|---|---|
| 69458 | 1/1983 | European Pat. Off. | 192/106.2 |
| 131851 | 10/1981 | Japan | 192/106.2 |

*Primary Examiner*—Daniel P. Stodola
*Attorney, Agent, or Firm*—Armstrong, Nikaido, Marmelstein & Kubovcik

[57] ABSTRACT

A damper disc with serial torsion spring, in which a pair of projecting hub-side flanges protruding radially outwardly are provided on a central hub, a pair of side plates fitting rotatably onto the hub and having holes extending in a disc circumferential direction are disposed on both sides of the hub-side flange, a pair of retainers having respectively a pair of retainer-side flanges fitting rotatably onto the hub and protruding in a disc radial direction are disposed in between the hub-side flange and the side plates, a coil spring extending approximately in the disc circumferential direction is interposed between the retainer-side flange and holes of side plates and the hub-side flange to resiliently couple the hub and the side plates in the disc circumferential direction; characterized by that said coil spring is composed of a high-rigidity large-diameter main spring and a low-rigidity small-diameter sub spring fitted therein, one side of the pair of retainer-side flanges has a projection protruding to one side of the sub spring contacting therewith, another side of the retainer-side flanges has a projection protruding to another side of the sub spring, thereby the projection of the retainer-side flange is adapted to compress only the sub spring at an initial stage of twisting of the disc.

5 Claims, 2 Drawing Sheets

DAMPER DISC WITH SERIAL TORSION SPRINGS

This application is a continuation of application Ser. No. 758,997 filed July 25, 1985, now abandoned.

BACKGROUND OF THE INVENTION

Industrial useful Field

This invention relates to a damper disc with serial torsion springs usable as a clutch disc assembled in an automobile, an agricultural machine or a construction machine etc., or as a marine damper.

Prior Art

A mechanism has conventionally been known, in which a pair of projecting hub-side flanges protruding radially outwardly are provided on a central hub, a pair of side plates fitting rotatably onto the hub and having holes extending in a disc circumferential direction are disposed on both sides of the hub-side flange, two retainers having respectively a pair of retainer-side flanges fitting rotatably onto the hub and protruding in a disc radial direction are disposed in between the hub-side flange and the side plates, each retainer-side flange and each hub-side flange are disposed and spaced approximately equally in the disc circumferential direction, and a coil spring extending approximately in the disc circumferential direction is interposed between the retainer-side flange & holes of side plates and the hub-side flange to resiliently couple the hub and the side plates in the disc circumferential direction (Japan Patent unexamined Publication (KOUKAI) No. 54-96651).

In this mechanism, however, a wide range of twist angle characteristic is obtainable as compared with a general torsion spring type damper disc, but on the other hand a twist rigidity characteristic can not be changed in multi-stages. Therefore, in the above mechanism, a small torsional vibration within a range of low twist angle can not be effectively absorbed when a twist rigidity is set high, and a torsional vibration can not be effectively absorbed in case where the torsional vibration is large when the twist rigidity is set low.

Problem to be solved by this invention

The above-mentioned conventional mechanism includes a problem that a wide range of twist angle characteristic can be obtained, but on the other hand sufficient vibration absorption effect can not be obtained because the twist rigidity characteristic can not be changed in multi-stages.

The present invention is intended to solve the above-mentioned problem by enabling the twist rigidity to be changed in two stages while taking the advantage of the wide twist angle characteristic which is a feature of the damper disc with serial torsion springs.

Countermeasures to solve the problem

A damper disc with serial torsion springs, in which a pair of projecting hub-side flanges protruding radially outwardly are provided on a central hub, a pair of side plates fitting rotatably onto the hub and having holes extending in a disc circumferential direction are disposed on both sides of the hub-side flange, a pair of retainers having respectively a pair of retainer-side flanges fitting rotatably onto the hub and protruding in a disc radial direction are disposed in between the hub-side flange and the side plates, a coil spring extending approximately in the disc circumferential direction is interposed between the retainer-side flange & holes of side plates and the hub-side flange to resiliently couple the hub and the side plates in the disc circumferential direction; characterized by that said coil spring is composed of a high-rigidity large-diameter main spring and a low-rigidity small-diameter sub spring fitted therein, one side of said pair of retainer-side flanges has a projection protruding to one side of the sub spring contacting therewith, another side of said retainer-side flanges has a projection protruding to another side of the sub spring, thereby the projection of said retainer-side flange is adapted to compress only the sub spring at an initial sage of twisting of the disc.

DETAILED DESCRIPTION OF THE INVENTION

Embodiment

Figure 1:
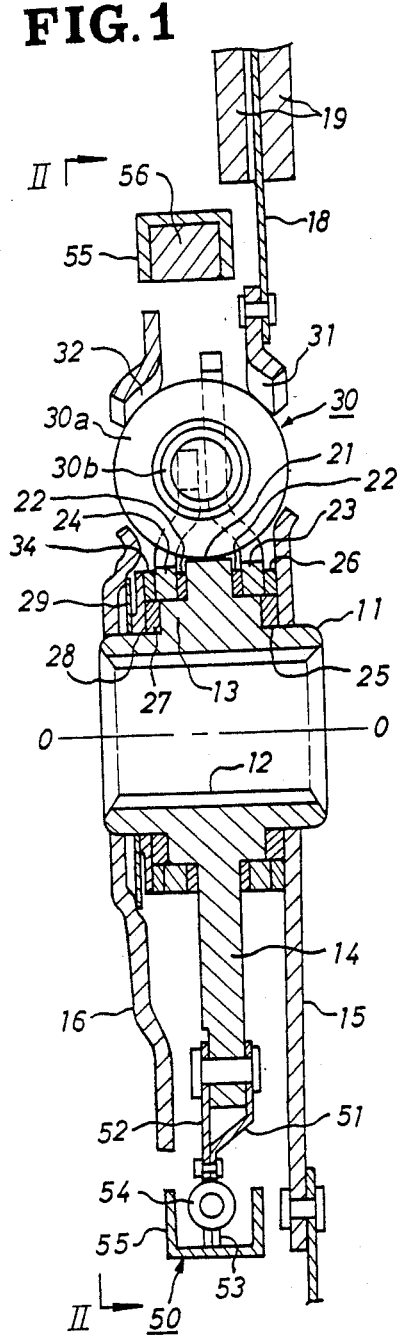
FIG. 1 is a vertical sectional partial view corresponding to a partial sectional view taken on a line I—I of FIG. 2.
Figure 2:
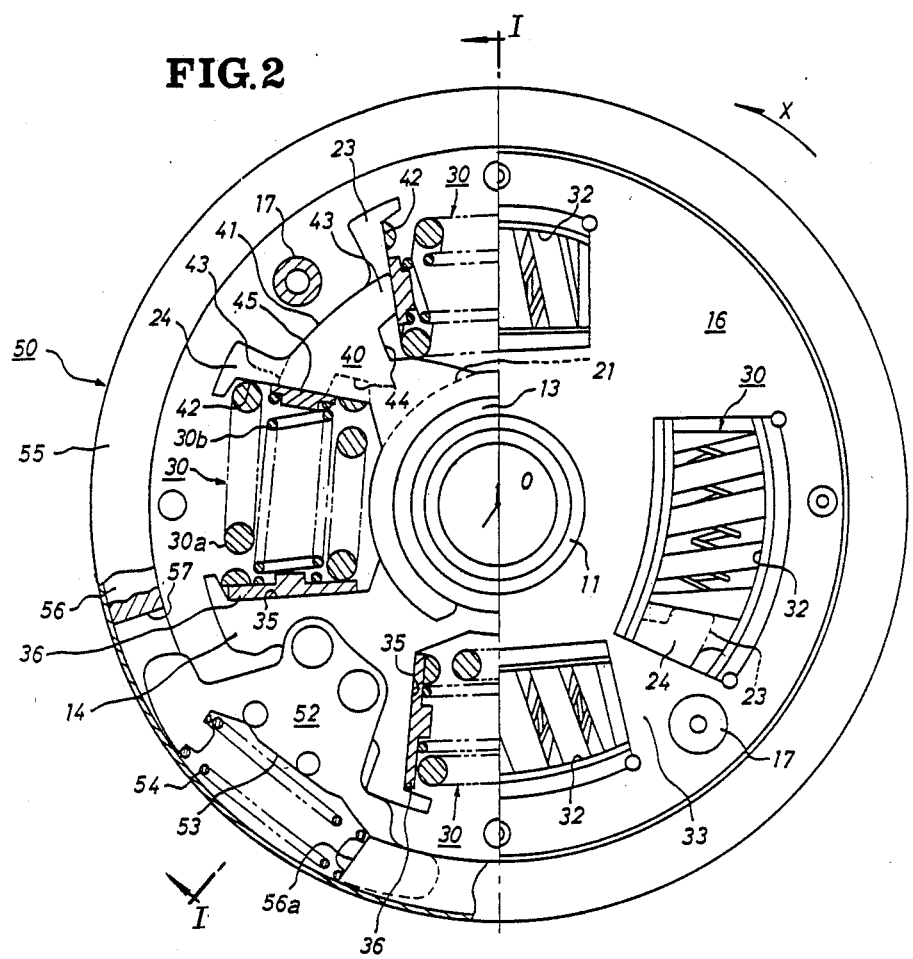
FIG. 2 is a partially cut-away view taken on a line II—II of FIG. 1.

FIG. 1 shows a damper disc according to this invention employed for an automobile clutch disc, and is a partial sectional view taken on the line I—I of FIG. 2 which is a partial view taken on the line II—II thereof. In FIG. 1, a central hub 11 has a spline 12 on its inner peripheral surface, and is adapted to spline fit onto a not-shown output shaft. A flange base portion 13 protrudes annularly at an outer peripheral part of the hub 11, and a pair of hub-side flanges 14 (only one side being illustrated) are further provided integrally on the flange base portion 13 in the identical radial direction. A pair of annular side plates 15 & 16 (clutch plate and retaining plate) fit rotatably onto the hub 11 on both sides (left and right sides of FIG. 1) of the flange base portion 13, and the side plates 15 & 16 are integrally connected together by a pin 17 (FIG. 2) parallel to a center line 0—0. A cushioning plate 18 extending outwardly in the same plane is fixed by rivets to an outer peripheral end part of the side plate 15, and friction facings 19 disposed between a not-shown engine-side flywheel and a pressure plate are fastened to both sides of the cushioning plate 18.

The flange base portion 13 annularly has on its outer peripheral part a protruding strip 21 having the same thickness as the hub-side flange 14, and annular parts of retainers 23 & 24 rotatably fit onto the flange base portion 13 through friction washers 22 on both sides of the protruding strip 21. Further, an annular friction washer 25 is interposed between a center line 0—0 directional end face of the flange base portion 13 and the side plate 15, and an annular friction washer 26 pressing the retainer 23 onto the protruding strip 21 side is interposed on an outer peripheral side of the friction washer 25. An annular friction washer 27, a support plate 28 and a cone spring 29 are disposed from the flange base portion 13 side in this order between the flange base portion 13 and the side plate 16, and the cone spring 29 is compressedly assembled so that the friction washer 25 & 27 are pressed against the flange base portion 13. An annular friction washer 34 is interposed on an outer peripheral side of the friction washer 27, and presses the retained 24 onto the protruding strip 21 side. Further, each four holes 31 & 32 (described later) are provided on the side plates 15 & 16 at their peripheral sides outer than the protruding strip 21, and center line 0—0 directional both ends of a coil spring 30 are fitted in the holes 31 & 32. The coil spring 30 has a high-rigidity and is composed of a large-diameter main spring 30a and a small-diameter sub spring 30b which fits in the main spring 30a, and a rigidity of the sub spring 30b is set sufficiently small as compared with the main spring 30a.

Figure 3:
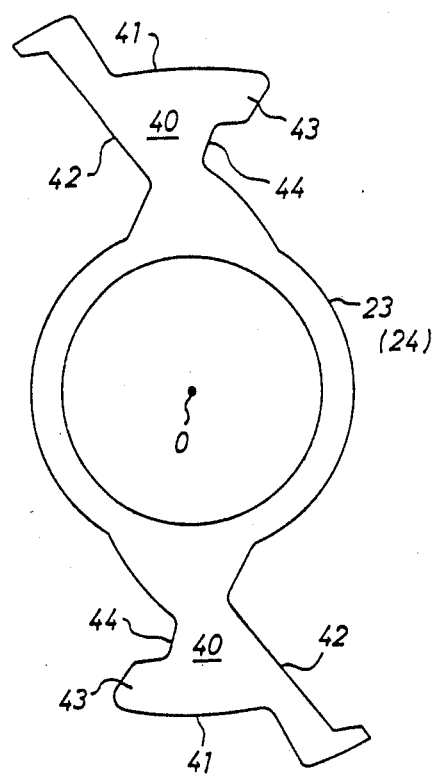
FIG. 3 is a front view of a retainer.

As shown in FIG. 2, two among four of the holes 32 (31) form one set, and one set of the holes 32 (31) are disposed close to each other through a partition 33 of the side plate 16 (15). On the other hand, the hub-side plate 14 is formed integrally with the hub 11 into an approximately sectorial shape in such a position as protruding radially outwardly from the hub 11. Recessions 35 formed on both disc circumferential end faces of the hub-side flange 14 align with both disc circumferential end faces of one set of the holes 32 (31) viewing in the center line 0—0 direction (direction in FIG. 2) under a free state of disc, and a spring seat 36 disposed at a disc circumferential end of the coil spring 30 contacts with the recession 35 of the hub-side flange 14 and the disc circumferential end face of the hole 32 (31). On the other hand, the retainer 23 (24) integrally has a pair of retainer-side flanges 40 protruding outwardly in the same radial direction at an annular part fitting onto the flange base portion 13 (FIG. 1) as shown in FIG. 3. A notch 41 adapted to be engaged with said pin 17 (FIG. 2) is formed on an outer peripheral part of the retainer-side flange 40, and a contacting surface 42 with which the coil spring 30 (FIG. 2) contacts is formed on one circumferential end face of the retainer-side flange 40.

A projection 43 is formed at a side opposite to the contacting surface 42, and the projection 43 is disposed at a position where it contacts only with the sub spring 30b (FIG. 2) of the coil spring 30. A recession 44 in which a disc inner peripheral part of the main spring 30a (FIG. 2) is fittable is formed at a peripheral side inner than the projection 43.

As shown in FIG. 2, the retainer 23 and the retainer 24 are oppositely disposed to each other in such a manner that respective projections 43 are positioned at opposite sides, the other end of the coil spring 30 contacting with the hub-side flange 14 contacts with the contacting face 42. Under the disc free state shown in FIG. 2, the main spring 30a of the coil spring 30 is slightly compressed between the hub-side flange 14 and the retainer-side flange 40 to such an extent of not being loosened, and the sub spring 30b is compressed comparatively strongly. For this reason, the sub spring 30b presses both the contacting surface 42 and the projection 43 through the spring seat 45, and a pair of the retainer 23 & 24 are held in a state that the contacting surface 42 of one retainer alignes with a tip end of the projection 43 of the other retainer. Although an end portion of the main spring 30a contacts therefore with the contacting surface 42 of the retainer-side flange 40 of one retainer, a clearance corresponding to a protruding length of the projection 43 is formed between said end and the recession 44 of the other retainer.

Incidentally, the pin 17 engages with the notch 41 of the retainers 23 & 24 with a disc circumferential play left therebetween. Further, a disc circumferential width of the partition 33 formed between the pair of holes 32 (31) is so determined as not to interfere with contact of surfaces 42 and projections 43 of retainer 23, 24 with coil spring 30 while torque is initially applied to the disc. Therefore, a clearance is always formed between the coil spring 30 and the partition 33 when the disc is at rest.

A dynamic damper 50 provided at the outer periphery of the hub-side flange 14 is constructed as follows. In FIG. 1, a pair of sub-plates 51 & 52 are fastened to the outer peripheral part of the hub-side flange 14, and the both sub-plates 51 & 52 are put together at a peripheral position on hub-side flange 14. A torsion spring 54 extending in the disc circumferential direction is dispsoed in notches 53 formed on the sub-plates 51 & 52 extending toward the outer peripheral side. An annular retainer 55 a section of which has a U-shape opening toward the inside is disposed in such a manner as covering the torsion spring 54 from the outer peripheral side and the both sides, and the annular retainer 55 is an annular member having its center at the center line 0—0. As shown in FIG. 2, a circular weight 56 is fixed to an area of the annular retainer 55 other than that occupied by the torsion spring 54, and a split 57 slidingly holding outer peripheral parts of the sub-plates 51 & 52 through a not-shown friction member is formed at a circumferential end of the weight 56. Under the free state, a clearance is formed between a bottom of the slot 57 and the sub-plates 51 & 52, and a circumferential end face 56a of the weight 56 contacts with the torsion spring 54. Incidentally, the composition of this part of sub-plates 51 & 52 is also provided at a radially opposite disc position in the same manner (not shown), thereby holding the dynamic damper 50 in the position having its center at the center line 0—0.

Function of the damper disc will be described hereunder. In FIG. 1, when the friction facing 19 is held between the not-shown flywheel and the pressure plate, a torque from an engine is transmitted to the friction facing 19. The torque is then transmitted from the friction facing 19 to cushioning plate 18 and side plate 15, 16. A partial transmitted torque of the side plate 15 is transmitted through friction washer 26 to the retainer 23. The other partial transmitted torque of the side plate 16 is transmitted through friction washer 34 to the retainer 24. The transmitted torque of the side plates 15, 16 is transmitted through hub-side flange 14 to the hub 16. Thus, a power is transmitted to the not-shown output shaft.

Here, for example, if a twist torque is applied to the friction facing 19 in a direction of arrow X of FIG. 2 relatively to the hub 11, the damper operates as follows to absorb its torque vibration. When the friction facing 19 twists relatively to the hub 11, a clearance between the disc circumferential end faces of the holes 31 & 32 and the recession 35 of the hub-side flange 14 facing respectively thereto in the disc circumferential direction becomes narrow to compress the coil spring 30. Since the rigidity of the main spring 30a of the coil spring 30 is made sufficiently larger than that of the sub spring 30b, the main spring 30a acts as a rigid body to press on the contacting surface 42 of the retainer-side flange 40 at an initial state of twisting. As the result, the retainers 23 & 24 relatively rotate in circumferentially opposite directions to each other to cause the projection 43 to compress the sub spring 30b through the spring seat 45. This compression state continues till the main spring 30a contacts with the recession 44. A relation between a twist angle $\theta$ and a twist torque T of this case becomes as a line $0 \sim \theta_1$ of FIG. 4, and an increment of the twist angle is small.

When a further strong twist torque is applied to the friction facing 19 relatively to the hub 11 in the direction X, also the main spring 30a is compressed together with the sub spring 30b to cause the twist angle to reach its maximum value $\theta_2$. Since the main spring 30a is also compressed in addition to the sub spring 30b within a range of $\theta_1 \sim \theta_2$, an increment of the twist torque in relation to the twist angle becomes large. Namely, the twist-angle/twist-torque characteristic changes in two stages at a boundary $\theta_1$. Further, two coil springs 30 are disposed in series in the disc circumferential direction through the retainers 23 & 24, so that the wide twist angle characteristic which is the feature of the serial disposition type is obtainable.

When the twist angle returns from the maximum twist angle $\theta_2$, the disc actuates in the reverse order of the above, and the twist angle $\theta$/twist torque T characteristic changes in two stages at the boundary $\theta_1$.

Figure 4:
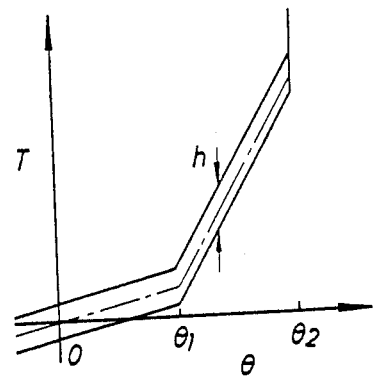
FIG. 4 is a graph showing a twist-angle/twist-torque characteristic.

Since frictions are produced on surfaces of the friction washers 22, 25, 27 etc. due to the above operation, a hysteresis torque h is generated in the twist angle $\theta$/twist torque T characteristic as shown in FIG. 4. This hysteresis torque h absorbes an energy of twist torque to absorb the torsional vibration. When the disc is twisted in the reverse direction of X, the disc actuates samely in the reverse direction to provide a similar twist angle $\theta$/twist torque T characteristic (omitted in FIG. 4).

On the other hand, the dynamic damper 50 absorbs the torque vibration applied to the hub 11 in the following manner to further improve the above-mentioned torque vibration absorption effect. Since the weight 56 exists at the periphery of hub-side flange 14 and is larger in its weight, inertia moment is large. Accordingly, when the hub-side flange 14 receives some torque vibration, a relative disc circumferential rotation is caused between the sub-plates 51 & 52 and the weight 56. Thereby, the torsion spring 54 is compressed between the notch 53 and the end face 56a, and at the same time a friction is produced on not-shown friction members provided between the sub-plates 51 & 52 and the weight 56 to absorb the torque vibration.

Effect of the Invention

A pair of projecting hub-side flanges 14 protruding radially outwardly are provided on the central hub 11, a pair of side plates 15 & 16 fitting rotatably onto the hub 11 and having holes 31 & 32 extending in the disc circumferential direction are dispsoed on both sides of the hub-side flanges 14. A pair of retainers 23 & 24 having respectively a pair of retainer-side flanges 40 are fitting rotatably onto the hub 11 and protruding from the hub in the disc radial direction and are disposed in between the hub-side flange 14 and the side plates 15 & 16. The coil springs 30 extending approximately in the disc circumferential direction are interposed between the retainer-side flange 40 & holes 31 & 32 of side plates 15 & 16. The hub-side flange 14 resiliently couples the hub 11 and the side plates 15 & 16 in the disc circumferential direction.

Coil spring 30 is composed of a high-rigidity large-diameter main spring 30a and a low-rigidity small-diameter sub spring 30b fitted therein. One side of the pair of retainer-side flange 40 has the projection 43 protruding to one side of the sub spring 30b the is in contact therewith. The other side of the retainer-side flange 40 has the projection protruding to another side of the sub spring 30b. The projection 43 of retainer-side flange 40 compresses the sub spring 30b at the initial stage of twisting of the disc, so that it becomes possible to change the twist rigidity in two stages for ensuring the sufficient vibration absorption effect while taking the advantage of the wide twist angle characteristic which is a feature of the damper disc with serial torsion springs.

Another embodiment (1) Such an arrangement may be employed, in which two (or more) pairs of the retainers 23 & 24 are provided, the flanges 40 for each pair of retainers 23 & 24 are disposed equally in the disc circumferential direction between the both hub-side flanges 14, the coil springs 30 are installed not only between the hub-side flanges 14 and the retainers 23 & 24 but between a pair of neighboring retainers 23 & 24. In this case, the maximum twist angle can be set even wider.

(2) The dynamic damper 50 is not required and may be omitted. Naturally, a damper disc equipped with the dynamic damper 50 has a higher vibration absorption ability.

What is claimed is:

1. A damper disc with serial torsion springs, in which a pair of projecting hub-side flanges protruding radially outwardly are provided on a central hub, a pair of side plates fitting rotatably onto the hub and having holes extending in a disc circumferential direction are disposed on both sides of said pair of hub-side flanges, a pair of retainers having respectively a pair of retainer-side flanges fitting rotatably onto the hub and protruding in a disc radial direction are disposed inbetween the hub-side flanges and the side plates, a coil spring assembly extending approximately in the disc circumferential direction is interposed between each of said retainer-side flanges and each of said holes of the side plates and the hub-side flange to resiliently couple the hub and the side plates in the disc circumferential direction; characterized by that said retainer-side flanges of said retainers are circumferentially aligned with one another and are relatively rotatable in circumferentially opposite directions and each said coil spring assembly is composed of a high-rigidity large-diameter outer main spring and a low-rigidity smalldiameter inner sub spring fitted coaxially in said outer spring, one side surface of each of said pair of retainer-side flanges of one of said pair of retainers has a projection protruding from said one side surface into one end of an outer main spring of a respective coil spring assembly and into contact with one end of the sub spring in said outer main spring of said respective spring assembly for compressing said sub spring in said outer main spring before compression is commenced in said outer spring, the opposite side surface of the other of said retainer-side flanges of said other of said pair of retainers has a projection protruding from its side surface into one end of an outer main spring of another of said coil sring assemblies, and into contact with one end of the sub spring in the outer main spring of said another spring assembly for compressing said contacted sub spring in said main spring before compression is commenced in said outer spring of said another assembly, said sub spring compression of said inner sub springs before compression in said outer springs commences taking place during the initial stage of twisting of the disc in said circumferentially opposite directions.

2. A damper disc with serial torsion springs as set forth in claim 1, in which a dynamic damper for damping torque vibration applied to said hub is mounted at a radially outward position on said hub-side flange.

3. A damper disc with serial torsion springs as set forth in claim 2, in which said dynamic damper has a torsion spring mounted in notches in sub-plates mounted on said hub-side flange and a weight inside an annular retainer mounted radially outward of said hub-side flange.

4. A damper disc with serial torsion springs, as set forth in claim 1, in which said projections protruding from the retainer-side flanges of said retainers are aligned with the ends of said sub springs.

5. A damper disc with serial torsion springs, in which a pair of projecting hub-side flanges protruding radially outwardly are provided on a central hub, a pair of side plates fitting rotatably onto said hub and extending in a circumferential direction are disposed on both sides of said pair of hub-side flanges, a pair of retainers having respectively a pair of retainer-side flanges fitting rotatably onto the hub and protruding in a radial direction are disposed in between said hub-side flanges and said plates, a coil spring assembly extending approximately in the circumferential direction is interposed between each of said retainer-side flanges and holes extending a circumferential direction in said side plates and said hub-side flanges to respectively couple said hub and said side plates in the disc circumferential direction; characterized by that said retainer-side flanges of said retainers are circumferentially aligned with one another and are relatively rotatable in circumferentially opposite directions and each said coil spring assembly is composed of a high-rigidity large-diameter main spring and a low-rigidity small-diameter sub spring fitted in said larger-diameter main spring, one side surface of said pair of retainer-side flanges of one of said retainers has a projection protruding to one side of a sub spring of a respective coil spring assembly and in contact therewith, an opposite side surface of said retainer-side flanges of the other of said retainers has a projection protruding to another side of a sub spring of another of said coil spring assemblies, thereby the projection of each retainer-side flange compresses only the respective sub spring at an initial stage of twisting of said disc in said circumferentially opposite directions, a dynamic damper for damping torque vibration applied to said hub is mounted at a radially outward position on said hub-side flange, and friction facings mounted on a cushioning plate mounted at a radially outward position on said side plate.

* * * * *